(12) United States Patent
Chen

(10) Patent No.: US 7,380,572 B2
(45) Date of Patent: *Jun. 3, 2008

(54) ENERGY ATTENUATION APPARATUS FOR A CONDUIT CONVEYING LIQUID UNDER PRESSURE, SYSTEM INCORPORATING SAME, AND METHOD OF ATTENUATING ENERGY IN A CONDUIT

(75) Inventor: Yungrwei Chen, West Bloomfield, MI (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/348,370

(22) Filed: Feb. 6, 2006

(65) Prior Publication Data

US 2006/0124186 A1 Jun. 15, 2006

Related U.S. Application Data

(63) Continuation-in-part of application No. 10/004,768, filed on Dec. 4, 2001, now Pat. No. 7,007,718, which is a continuation-in-part of application No. 09/370,658, filed on Aug. 6, 1999, now Pat. No. 6,338,363, which is a continuation-in-part of application No. 08/977,081, filed on Nov. 24, 1997, now Pat. No. 6,073,656.

(51) Int. Cl.
*F16L 55/04* (2006.01)
(52) U.S. Cl. .............................. 138/26; 138/30; 138/42; 138/44; 181/222; 181/232
(58) Field of Classification Search .................. 138/26, 138/30, 42, 44; 181/222, 232, 238, 256, 181/257, 275, 281
See application file for complete search history.

(56) References Cited

U.S. PATENT DOCUMENTS

| 443,220 | A | 12/1890 | Detrick |
|---|---|---|---|
| 593,726 | A | 11/1897 | Nicholls |
| 790,971 | A | 5/1905 | Nicholls |
| 889,423 | A | 6/1908 | Wood |

(Continued)

OTHER PUBLICATIONS

WO 96/18065, Forte, PCT published Jun. 13, 2006, WIPO parent document of the Forte 5,941,283 US patent.*

*Primary Examiner*—James F Hook
(74) *Attorney, Agent, or Firm*—Joseph V. Tasone; Robert W. Becker & Associates

(57) ABSTRACT

An energy attenuation apparatus in fluid communication with tubing adapted to convey a liquid under pressure, and including a liquid-conveying unit in fluid communication with the tubing and having a diameter greater than the tubing diameter. The liquid-conveying unit has four chambers in series, at least one of which contains a tube, wherein an annular space is formed between the inner peripheral surface of the unit and the outer peripheral surface of the tube. One end of the tube is connected to and in fluid communication with an inlet or outlet end of the chamber, and another, free end is spaced by an open gap from the outlet or inlet end of the chamber. The tube has at least one aperture in the free end and/or on the peripheral surface thereof for providing fluid communication between the tube and the chamber.

3 Claims, 13 Drawing Sheets

U.S. PATENT DOCUMENTS

| | | |
|---|---|---|
| 2,233,804 A | 3/1941 | Bourne |
| 2,330,564 A | 9/1943 | Dyer |
| 2,467,559 A | 4/1949 | Mahlberg |
| 2,683,973 A | 7/1954 | Mettler |
| 2,777,467 A | 1/1957 | Powell et al. |
| 2,858,854 A | 11/1958 | Daggett |
| 2,875,789 A | 3/1959 | Wright |
| 2,986,169 A | 5/1961 | McCormick |
| 3,016,503 A | 1/1962 | Pierce |
| RE25,384 E | 5/1963 | Bryant |
| 3,164,174 A | 1/1965 | Berthod et al. |
| 3,273,596 A | 9/1966 | Beckett |
| 3,276,478 A | 10/1966 | Bleasdale |
| 3,323,305 A | 6/1967 | Klees |
| 3,376,625 A | 4/1968 | McCulloch |
| 3,527,258 A | 9/1970 | Farr |
| 3,532,125 A | 10/1970 | Everett et al. |
| 3,610,289 A | 10/1971 | Moon |
| 3,842,940 A | 10/1974 | Bonikowski |
| 3,878,867 A | 4/1975 | Dirks |
| 3,889,717 A | 6/1975 | Obadal et al. |
| 3,933,172 A | 1/1976 | Allen |
| 3,934,824 A | 1/1976 | Fitzhugh |
| 4,043,539 A | 8/1977 | Gilmer et al. |
| 4,064,962 A * | 12/1977 | Hunt .................. 181/272 |
| 4,064,963 A | 12/1977 | Kaan et al. |
| 4,116,303 A | 9/1978 | Trudell |
| 4,285,534 A | 8/1981 | Katayama et al. |
| 4,371,053 A | 2/1983 | Jones |
| 4,456,034 A | 6/1984 | Bixby |
| 4,489,759 A | 12/1984 | Yamamura |
| 4,501,341 A | 2/1985 | Jones |
| 4,611,633 A | 9/1986 | Buchholz et al. |
| 4,637,435 A | 1/1987 | Chirdon |
| 4,671,380 A | 6/1987 | Henderson et al. |
| 4,700,805 A | 10/1987 | Tanaka et al. |
| 4,737,153 A | 4/1988 | Shimamura et al. |
| 4,762,150 A | 8/1988 | Kokuryu |
| 4,784,648 A | 11/1988 | Singh et al. |
| 4,787,419 A | 11/1988 | Megee et al. |
| 4,794,955 A | 1/1989 | Ejima et al. |
| 4,828,068 A | 5/1989 | Wendler et al. |
| 4,880,078 A | 11/1989 | Inoue et al. |
| 5,025,890 A | 6/1991 | Hisashige et al. |
| 5,094,271 A | 3/1992 | Fritz et al. |
| 5,168,855 A | 12/1992 | Stone |
| 5,172,729 A | 12/1992 | Vantellini |
| 5,201,343 A | 4/1993 | Zimmermann et al. |
| 5,367,131 A | 11/1994 | Bemel |
| 5,475,976 A | 12/1995 | Phillips |
| 5,495,711 A | 3/1996 | Kalkman et al. |
| 5,509,391 A | 4/1996 | DeGroot |
| 5,539,164 A | 7/1996 | van Ruiten |
| 5,582,006 A | 12/1996 | Phillips |
| 5,728,981 A | 3/1998 | van Ruiten |
| 5,785,089 A | 7/1998 | Kuykendal et al. |
| 5,941,283 A | 8/1999 | Forte |
| 5,983,946 A | 11/1999 | Chen et al. |
| 6,073,656 A | 6/2000 | Chen et al. |
| 6,085,792 A | 7/2000 | Cooper et al. |
| 6,089,273 A | 7/2000 | Cooper et al. |
| 6,119,728 A | 9/2000 | Seidel-Peschmann et al. |
| 6,123,108 A | 9/2000 | Chen et al. |
| 6,125,890 A | 10/2000 | Cooper et al. |
| 6,131,613 A | 10/2000 | Jenski, Jr. et al. |
| 6,155,378 A | 12/2000 | Qatu et al. |
| 6,158,472 A | 12/2000 | Hilgert |
| 6,240,964 B1 | 6/2001 | Cooper et al. |
| 6,269,841 B1 | 8/2001 | Chen et al. |
| 6,279,613 B1 | 8/2001 | Chen et al. |
| 6,338,363 B1 | 1/2002 | Chen et al. |
| 6,360,777 B1 | 3/2002 | Bae |
| 6,478,053 B2 | 11/2002 | Zanardi |
| 6,688,423 B1 * | 2/2004 | Beatty et al. .............. 181/207 |
| 7,007,718 B2 * | 3/2006 | Chen et al. .................. 138/26 |

\* cited by examiner

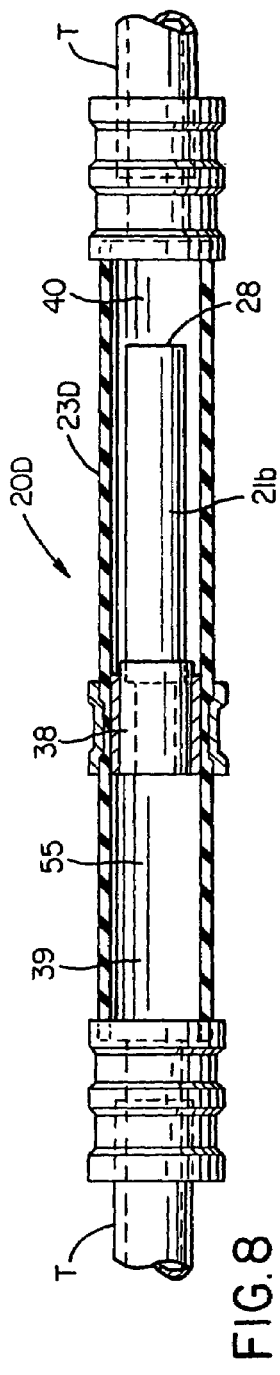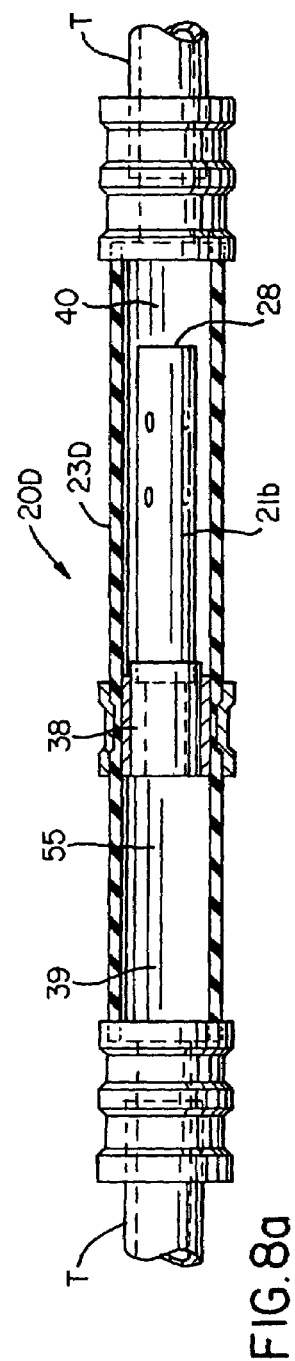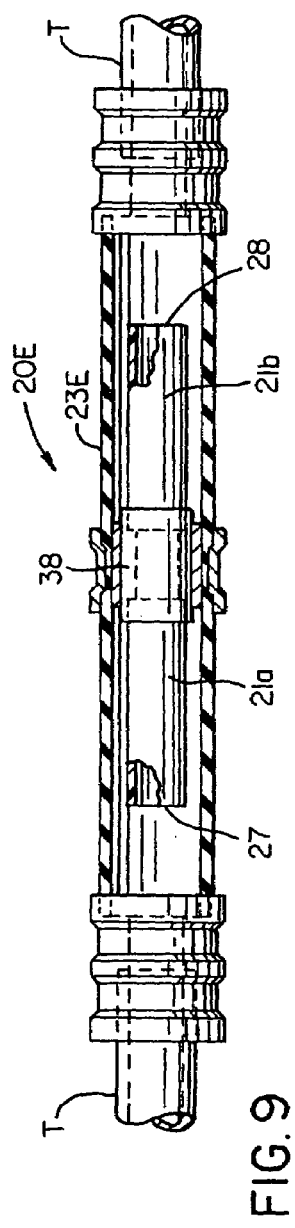

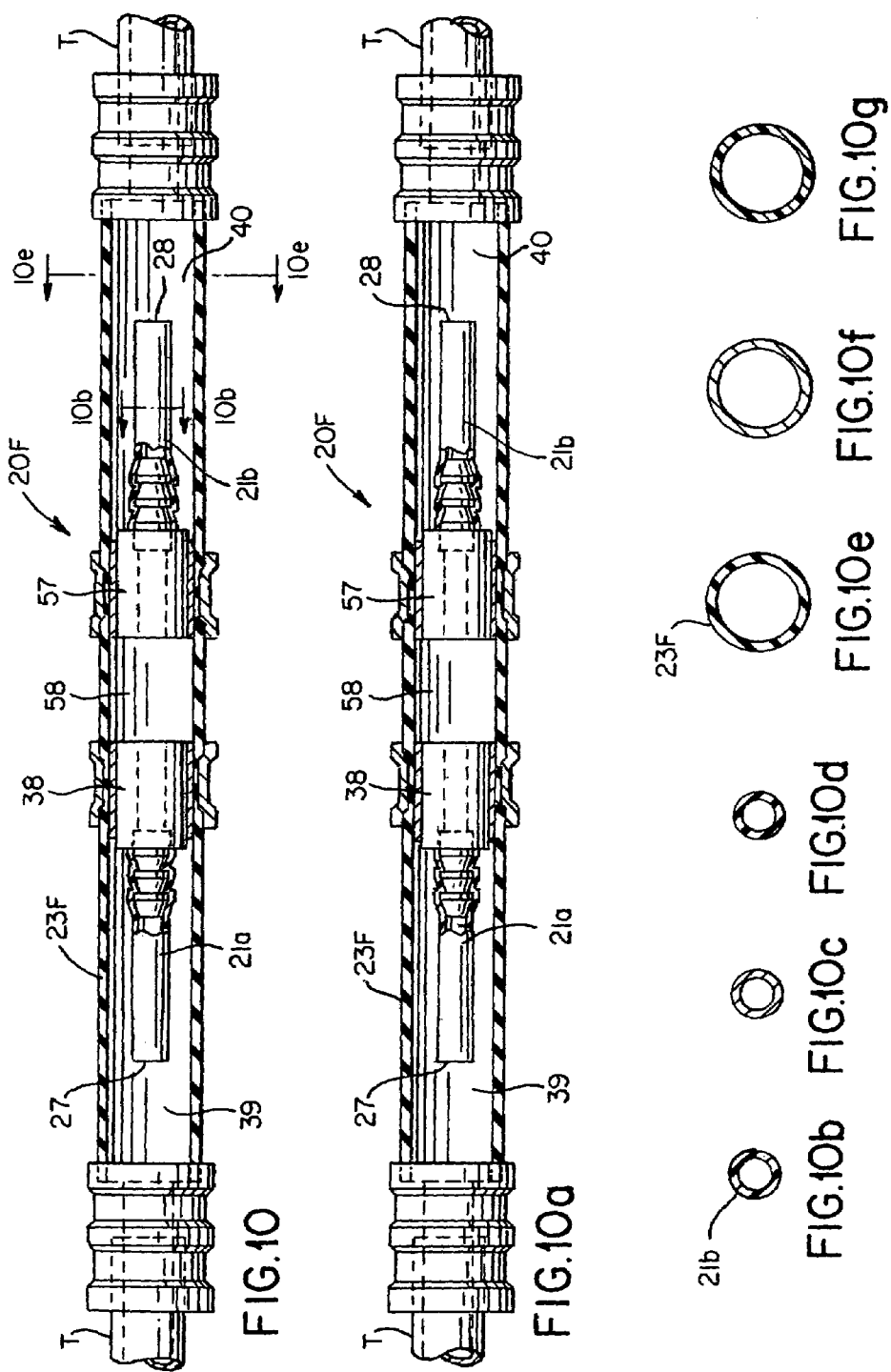

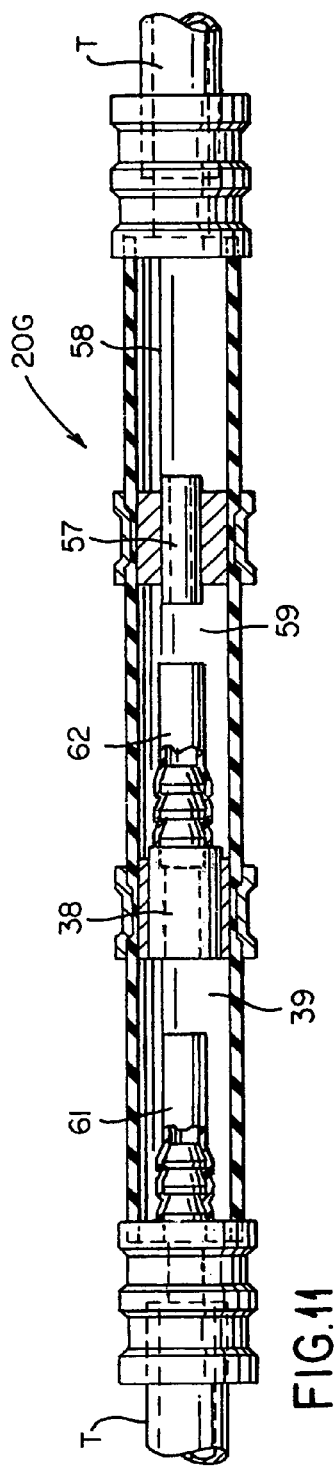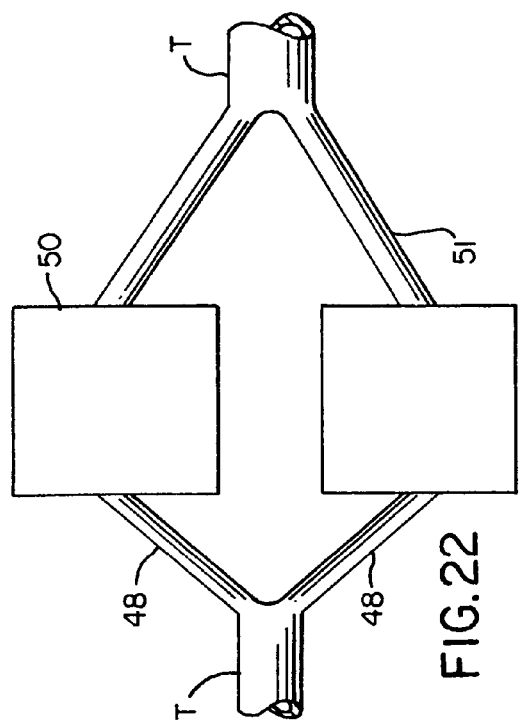

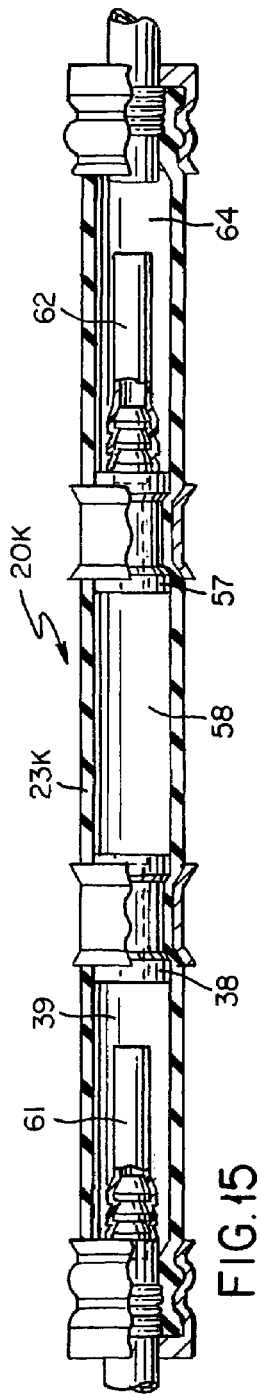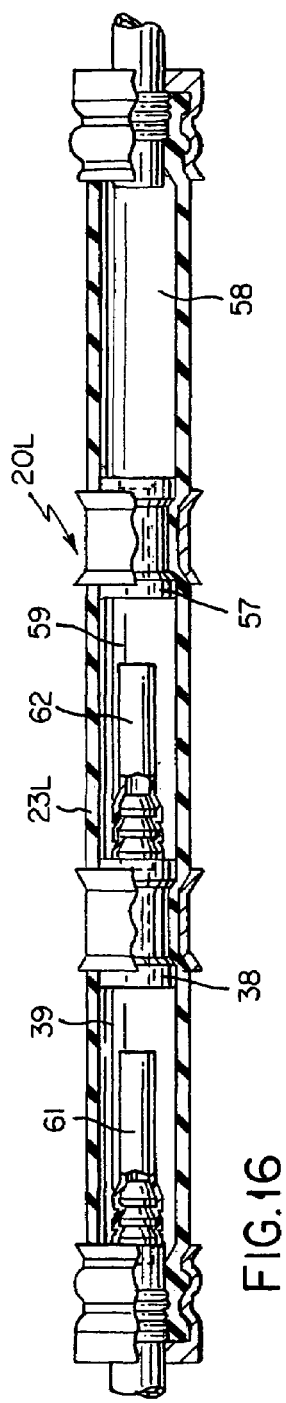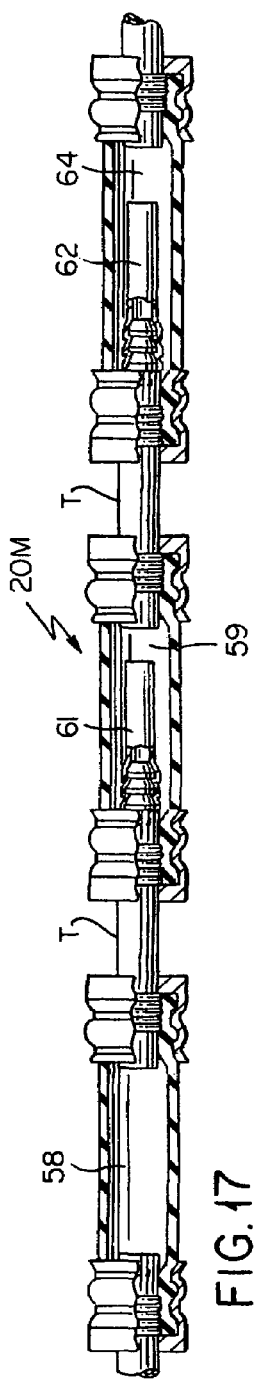

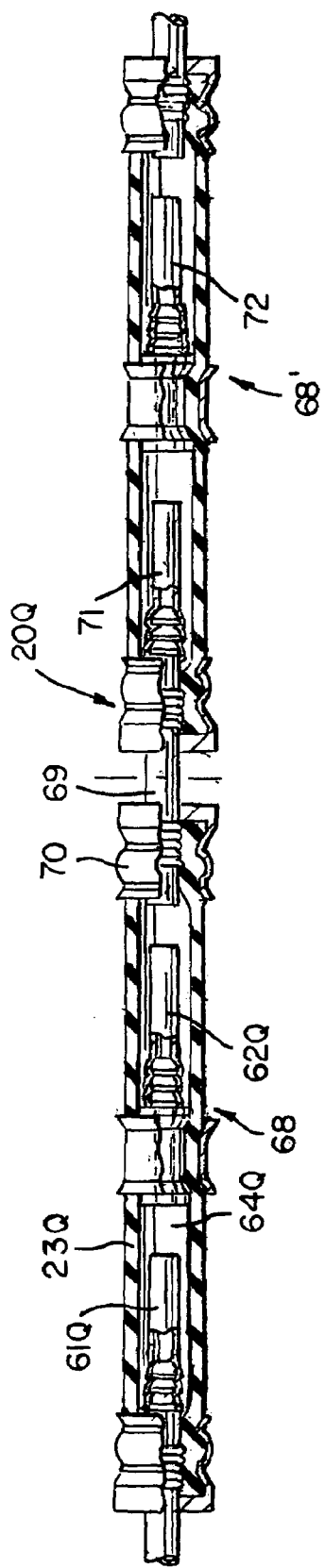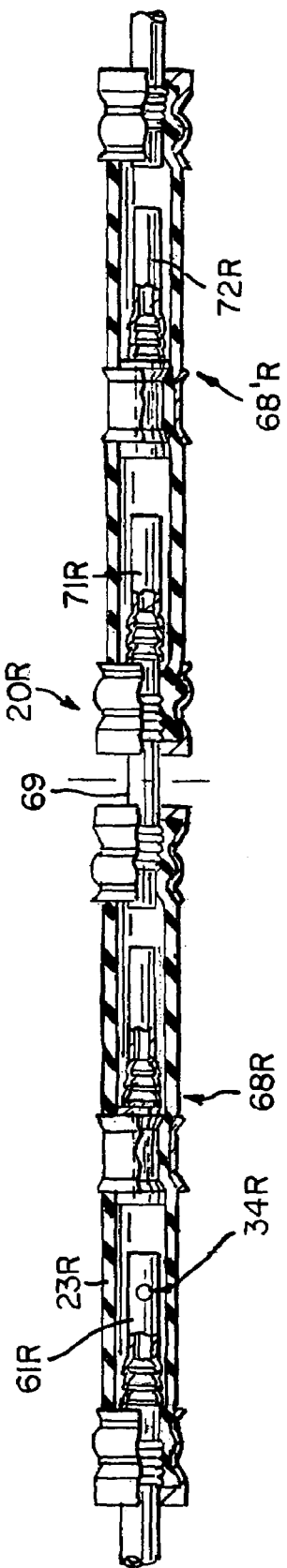

US 7,380,572 B2

ENERGY ATTENUATION APPARATUS FOR A CONDUIT CONVEYING LIQUID UNDER PRESSURE, SYSTEM INCORPORATING SAME, AND METHOD OF ATTENUATING ENERGY IN A CONDUIT

RELATED APPLICATIONS

This application is a continuation-in-part application of co-pending application Ser. No. 10/004,768 filed Dec. 4, 2001, now U.S. Pat. No. 7,007,718, which is a continuation-in-part application of Ser. No. 09/370,658 filed Aug. 6, 1999, now U.S. Pat. No. 6,338,363 issued Jan. 15, 2002, which is a continuation-in-part application of Ser. No. 08/977,081 filed Nov. 24, 1997, now U.S. Pat. No. 6,073,656 issued Jun. 13, 2000.

BACKGROUND OF THE INVENTION

1. Field of the Invention

This invention relates to a new energy attenuation apparatus for a conduit that is adapted to convey liquid under pressure, as well as a system incorporating such a device and a method of attenuating energy in a conduit. The invention is particularly suitable for placement in a conduit conveying liquid under pressure for the attenuation of pressure pulses in the liquid, especially in the hydraulic system of the power steering unit of a vehicle. The invention would also be suitable for other hydraulic fluids.

2. Prior Art Statement

In hydraulic systems where the operating liquid is circulated by a pump, the pulsations of pressure that are generated by the pump are transmitted through the conduits and result in noise and/or vibration being produced by the hydraulic liquid. In the case of power steering fluid in vehicles, such noise and/or vibration is caused, for example, when vehicles are being parked or unparked at idle or very low speeds of movement thereof, such as by barely moving into and out of a parking space or the like while the wheels of the vehicle are being turned by the power steering mechanism thereof. In particular, substantial noise and/or vibration (shudder) can be produced in such a situation when the power steering fluid passes through the power steering mechanism from the fluid pump to the effective steering structure. Further background into this area can be obtained from U.S. Pat. No. 3,323,305, Klees, whereby this U.S. Patent is being incorporated into this disclosure by this reference thereto.

Devices are known for suppressing noise in exhaust gas mufflers. For example, U.S. Pat. No. 4,501,341, Jones, provides two side branch resonators, while U.S. Pat. No. 4,371,053, Jones, provides for an apertured tube in a gas muffler housing. Systems are also known for controlling the resonation of pressure waves in fuel injection systems. For example, U.S. Pat. No. 5,168,855, Stone, passes fluid through check valves that are provided with a flow restriction either directly therein or in a bypass line. U.S. Pat. No. 5,509,391, DeGroot, provides a spool valve assembly for controlling flow between inlet and outlet ports.

Applicants are not aware of any teaching of transferring flow of liquid under pressure from one tube to another as a means of suppressing energy, especially where at least one of the tubes is provided with at least one hole.

SUMMARY OF THE INVENTION

It is therefore an object of the present invention to provide an improved apparatus, system and method for attenuating energy in a conduit that conveys liquid under pressure.

This object is realized pursuant to the energy attenuation apparatus of the present invention by providing liquid-conveying means in which the apparatus is disposed and which is in communication with tubing that is adapted to convey liquid under pressure, wherein the liquid-conveying means includes four chambers disposed in series, at least one of which contains a tube, wherein an annular space is formed between the inner peripheral surface of the liquid-conveying means and the outer peripheral surface of the tube, wherein the tube has a first end connected to and in fluid communication with an inlet or outlet end of its chamber, wherein the tube has a second, free end that is spaced by an open gap from the outlet or inlet end of its chamber, and wherein the tube has at least one aperture in the free end and/or on the peripheral surface thereof for providing fluid communication between the tube and its chamber.

Accordingly, it is an object of this invention to provide a novel energy attenuation device having one or more of the novel features of this invention as set forth above or hereinafter shown or described.

Another object of this invention is to provide a new system incorporating such an energy attenuation device, such a system having one or more of the novel features of this invention as set forth above or hereinafter shown or described.

Another object of this invention is to provide a new method of attenuating energy in a conduit conveying liquid under pressure, such a method having one or more of the novel features of this invention as set forth above or hereinafter shown or described.

BRIEF DESCRIPTION OF THE DRAWINGS

Other objects, uses, and advantages of this invention are apparent from a reading of the specification in conjunction with the accompanying schematic drawings, which form a part thereof and wherein:

FIG. 8 is a cross-sectional view of a fifth exemplary embodiment of the energy attenuation apparatus of this invention;

FIG. 8a shows a modification of the embodiment of FIG. 8;

FIG. 9 is a view similar to that of FIG. 4 of a modified energy attenuation apparatus of this invention;

FIG. 10 is a cross-sectional view of a sixth exemplary embodiment of the energy attenuation apparatus of this invention;

FIG. 10a shows a modification of the embodiment of FIG. 10;

FIGS. 10b to 10g are cross-sectional views taken through the hose means and the tubes;

FIG. 11 is a modification of the embodiment of FIG. 10;

FIG. 15 is a view similar to that of FIG. 12 of a modified energy attenuation apparatus of this invention;

FIG. 16 is a view similar to that of FIG. 12 of a modified energy attenuation apparatus of this invention;

FIG. 17 is a view similar to that of FIG. 12 of a modified energy attenuation apparatus of this invention;

FIG. 22 is a partial block diagram showing one arrangement for use in conjunction with the present invention;

FIG. 24 is a cross-sectional view of a further exemplary embodiment of the energy attenuation apparatus of this invention;

FIG. 25 is a view similar to that of FIG. 24 of a modified energy attenuation apparatus of this invention;

DESCRIPTION OF PREFERRED EMBODIMENTS

Figure 1:
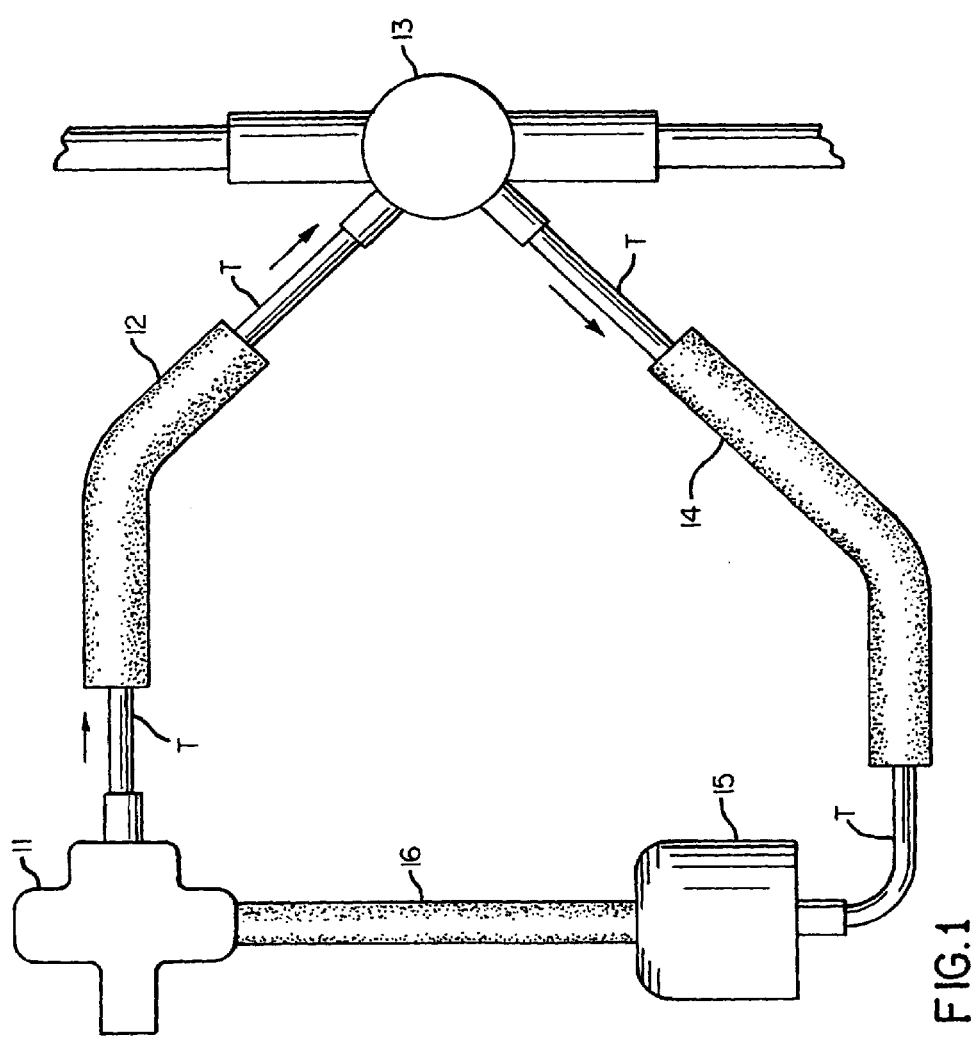
FIG. 1 illustrates a simplified automotive power steering system into which is to be incorporated an embodiment of the energy attenuation apparatus of this invention.

While the various features of this invention are hereinafter illustrated and described as providing an energy or sound attenuation device for an automotive power steering system, it is to be understood that the various features of this invention can be utilized singly or in various combinations thereof to provide an energy attenuation device for other systems that convey liquid, especially liquid under pressure.

Therefore, this invention is not to be limited to only the embodiment illustrated in the drawings, because the drawings are merely utilized to illustrate one of the wide variety of usages of this invention.

Referring now to the drawings in detail, FIG. 1 illustrates a simplified automotive power steering system. During operation, the power steering pump 11 generates pressure ripples that are transmitted through tubing T, such as steel tubing, to the pressure hose assembly or pressure line 12, the power steering gear 13, the return hose assembly or return line 14, and the reservoir 15, and finally flow back to the pump 11 itself by means of the supply line 16. It should be noted that rather than being separated by a hose or similar conduit, the reservoir 15 and the pump 11 could actually be a single unit.

In order to greatly reduce noise, such as from resonance, for example in the pressure line 12 or in the return line 14, and thereby eliminate or at least greatly reduce the power steering noise or vibration generated by the power steering pump 11, the energy attenuation device of this invention, which is indicated generally by the reference numeral 20, is disposed either in the pressure line 12, between the steering pump 11 and the gear 13, or in the return line 14, between the gear 13 and the reservoir 15 or the pump 11. In addition, it would also be conceivable to dispose the energy attenuation device 20 in both the pressure line 12 and the return line 14. Various exemplary embodiments of the energy attenuation device 20, and components and arrangements thereof, are illustrated in FIGS. 2-27 and will be described in detail subsequently.

The energy attenuation device 20 of this invention can, as indicated previously, be disposed in the pressure line 12 and/or the return line 14 of the system of FIG. 1. However, as illustrated in the exemplary embodiments of FIGS. 2-4, 6-19, and 23-27, the energy attenuation device 20 can also be disposed in one or more separate hose sections that are in turn disposed in such pressure line 12 or return line 14.

Figure 2:
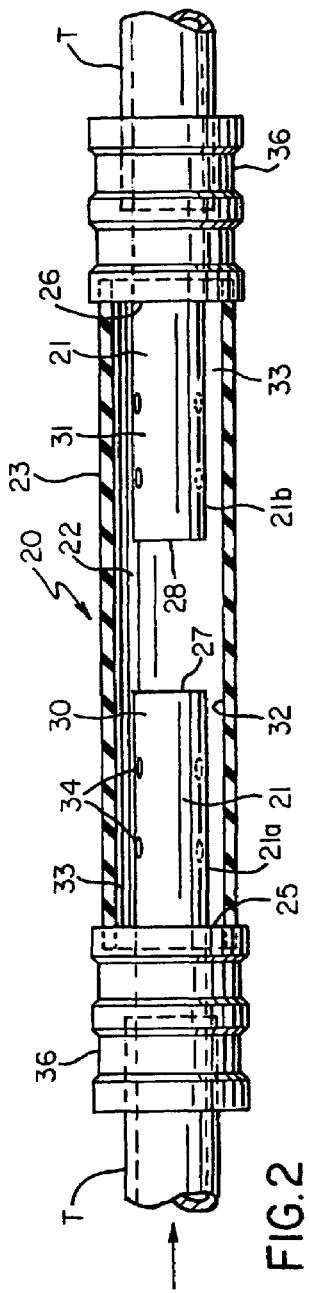
FIG. 2 is a cross-sectional view of one exemplary embodiment of the energy attenuation apparatus of this invention.

As can be seen from the embodiment of the energy attenuation device 20 illustrated in FIG. 2, two separate apertured tubes 21 are disposed in the chamber 22 formed in the hose section or liquid-conveying means 23. In particular, an inlet tube 21a is connected to the inlet end 25 of the chamber 22, whereas an outlet tube 21b is connected to the outlet end 26 of the chamber 22. The tubes 21a, 21b are disposed in the chamber 22 in such a way that not only are the free ends 27 and 28 thereof spaced from one another by an open gap, but the outer peripheral surfaces 30,31 of the inlet and outlet tubes 21a and 21b are spaced from the inner peripheral surface 32 of the hose or conduit means 23 in such a way that an annular space 33 is respectively provided about the outer peripheral surfaces 30,31 of each of the tubes 21a, 21b. By means of at least one, preferably several, holes 34 provided in each of the outer peripheral surfaces 30, 31 of the inlet and outlet tubes 21a, 21b, liquid entering the hose means 23 via the tubing T can exit the inlet tube 21a into first the annular space 33 and then part of the remainder of the chamber 22, from where it can flow through further holes 34 into the outlet tube 21b and from there out of the hose means 23 into the right-hand tubing T. Depending upon whether the free ends 27, 28 of the tubes 21a, 21b are opened or closed, all or only part of the liquid in the pressure line 12 or return line 14 will pass through the holes 34 out of the inlet tube 21a and into the outlet tube 21b. Details concerning the open or closed state of the free ends 27, 28 of the tubes 21a, 21b will be discussed subsequently.

In the embodiment of the energy attenuation device 20 illustrated in FIG. 2 the hose section 23, which is made, for example, of rubber or other elastomeric material, is disposed in the pressure line 12 or the return line 14 and is connected to the tubing T, in a fluid conveying or communicating manner, via respective couplings 36 and connectors, which can be of the type illustrated in FIGS. 11-19 and 23-27 and described in Applicants' U.S. Pat. No. 6,279,613, the disclosure of which is hereby incorporated into this application by this reference thereto.

As indicated previously, the free ends 27, 28 of the inlet tube 21a and outlet tube 21b can be either open or closed off. Several possibilities exist for configuring the free ends 27 and 28. For example, both free ends could be open, or both could be closed. In addition, the free end 27 of the inlet tube 21a could be open while the free end 28 of the outlet tube 21b could be closed. On the other hand, the opposite arrangement could also be provided whereby the free end 27 of the inlet tube 21a would be closed and the free end 28 of the outlet tube 21b would be open.

Although the embodiment illustrated in FIG. 2 provides for a single chamber 22 with the free ends 27, 28 of the inlet and outlet tubes 21a, 21b facing each other at the middle of the hose mixing region of the chamber 22, it has been found according to the teachings of this invention that other configurations are also possible. For example, reference is now made to FIG. 3, wherein another configuration of the energy attenuation device of this invention is shown and is indicated generally by the reference numeral 20A, wherein parts thereof similar to the energy attenuation device 20 of FIG. 2 are indicated by like reference numerals that where appropriate are followed by the reference letter A.

Figure 3:
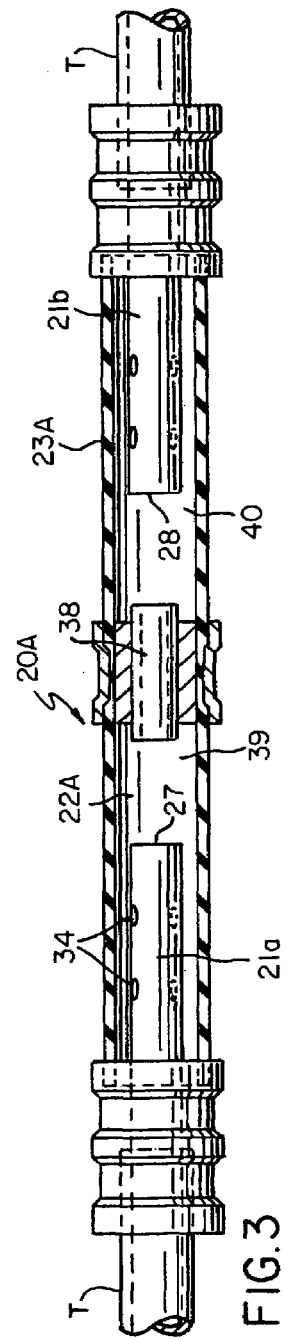
FIG. 3 is a cross-sectional view of a second exemplary embodiment of the energy attenuation apparatus of this invention.
Figure 5:
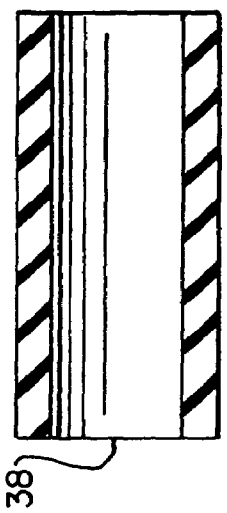
FIGS. 5, 5a and 5b are enlarged cross-sectional views of a restrictor for use with an energy attenuation apparatus of this invention.
Figure 5A:
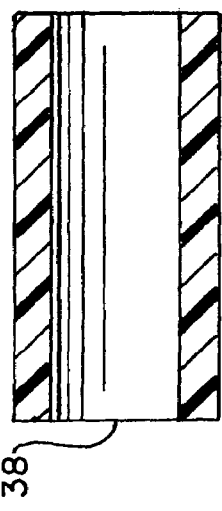
Figure 5B:
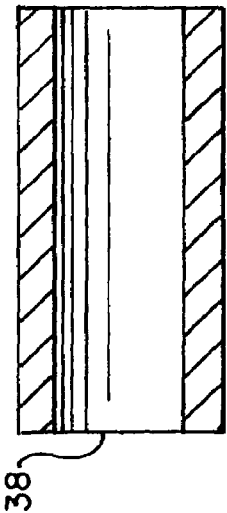

The embodiment of the energy attenuation device 20A illustrated in FIG. 3 differs from that shown in FIG. 2 in that the chamber 22A is divided by a restrictor 38 into an inlet chamber portion 39 and an outlet chamber portion 40. An enlarged view of the restrictor 38 is shown in FIGS. 5-5b; the inner diameter of the restrictor is less than the inner diameter of the hose means 23A. It should be noted that the restrictor 38 is disposed in the hose means 23A, for example by crimping, in such a way that communication between the chamber portions 39 and 40 can be only via the passage means, i.e. the reduced diameter portion, of the restrictor. The free end 27 of the inlet tube 21a is spaced from the restrictor 38 in the inlet chamber portion 39, while the free end 28 of the outlet tube 21b is spaced from the restrictor 38 in the outlet chamber portion 40. Thus, with the energy attenuation device 20A, liquid that is exiting the inlet tube 21a, either entirely or at least partially via the holes 34, will enter the inlet chamber portion 39, will then flow through the reduced diameter portion of the restrictor 38, will enter the outlet chamber portion 40, and then at least partially via the holes 34 will enter the outlet tube 21b. As discussed in conjunction with the energy attenuation device 20 of FIG. 2, the free ends 27, 28 of the inlet and outlet tubes 21a, 21b can be either both open, both closed, or only one open and the other closed.

In the embodiment of the energy attenuation device 20A the inlet and outlet tubes 21a, 21b are connected to the inlet and outlet ends 25, 26 of the respective inlet chamber portion 39 or outlet chamber portion 40. However, it would also be possible to connect the inlet and outlet tubes 21a, 21b directly to the restrictor 38 instead of to the inlet and outlet ends of the chamber. Such connection can again be effected via the aforementioned connectors of Applicants' U.S. Pat. No. 6,279,613. For example, reference is now made to FIG. 4, wherein another energy attenuation device of the present invention is shown and is indicated generally by the reference numeral 20B.

In the embodiment of the energy attenuation device 20B, the free ends 27, 28 of the inlet and outlet tubes 21a, 21b face away from one another, namely toward the inlet and outlet ends of the inlet chamber portion 39 and outlet chamber portion 40 respectively, and are spaced from such inlet and outlet ends. Again, the free ends 27, 28 of the inlet and outlet tubes 21a, 21b can both be opened, can both be closed, or only one can be opened with the other being closed.

Figure 6:
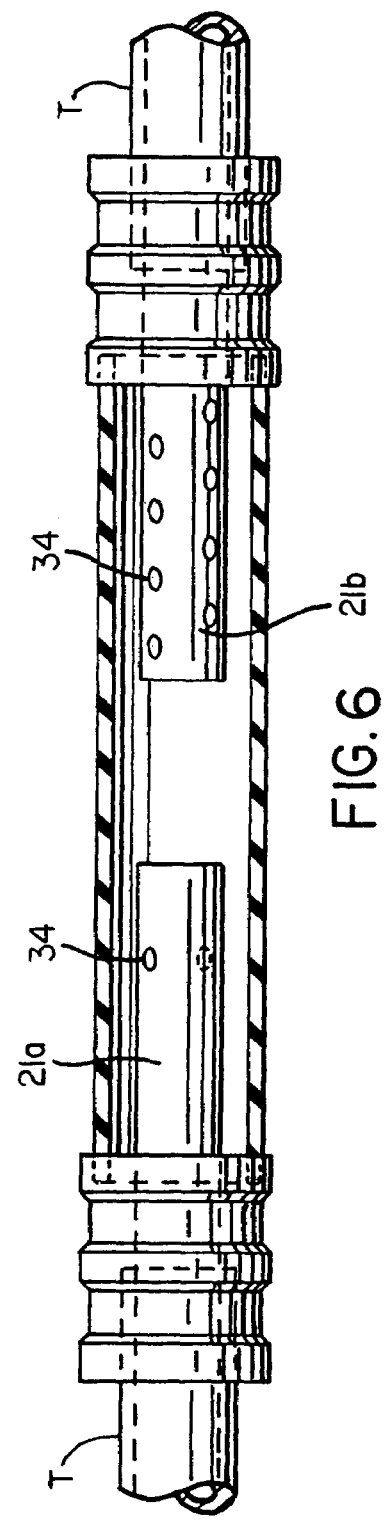
FIG. 6 is a view similar to that of FIG. 2 of a modified energy attenuation apparatus of this invention.
Figure 7:
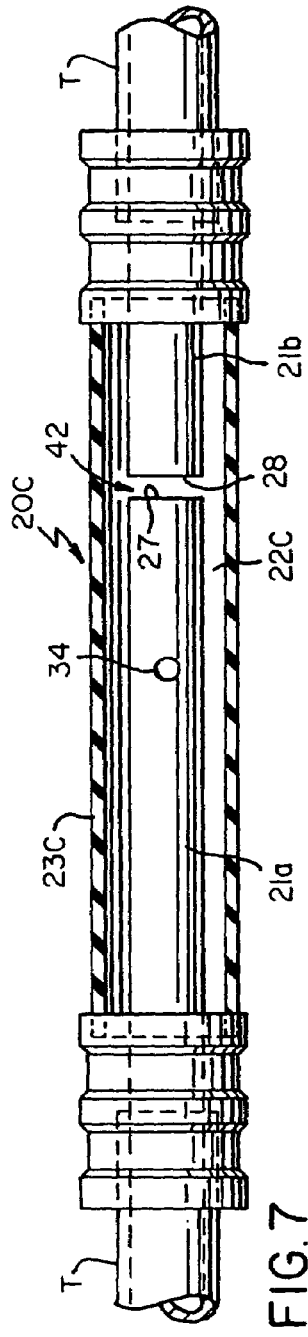
FIG. 7 is a cross-sectional view of a fourth exemplary embodiment of the energy attenuation apparatus of this invention.

As indicated above, the two separate apertured tubes 21a, 21b are each provided with at least one hole 34 in the outer peripheral surface thereof. Pursuant to some presently preferred embodiments, it is contemplated that each of the apertured tubes 21 will have a plurality of such holes 34. Several arrangements of these holes 34 are possible. For example, the holes 34 can be arranged in a longitudinal direction in one or more rows of such holes, either aligned or offset relative to one another, or can also be disposed in a random manner about the peripheral surfaces 30, 31 of the tubes 21a, 21b. FIG. 6 shows one such possible arrangement. In this embodiment, the apertured tube 21a on the inlet side has two holes 34 disposed 180° from one another. In contrast, the apertured tube 21b on the outlet side has two rows of four holes 34, with the rows being disposed 90° from one another, and with the holes of one row being offset in a longitudinal direction from the holes of the other row. In addition, the free end of the tube 21a is open while the free end of the tube 21b is closed. It is to be understood that although the arrangement of FIG. 6 has been illustrated in conjunction with a tube arrangement similar to that of FIG. 2, such an arrangement of the holes 34 would be possible for any of the embodiments previously described.

In addition to the number and arrangement of the holes 34 in the apertured tubes 21, it will be appreciated that other system parameters will affect the noise attenuation that can be achieved. For example, the ratios and dimensions of the components of the device relative to one another can be varied. Although in the illustrated embodiments the lengths of the inlet and outlet tubes 21a, 21b are shown as being the same, the lengths of these two tubes can also differ from one another. In addition, the inlet and outlet tubes 21a, 21b can extend over varying proportions of the chamber 22. In the embodiment of the energy attenuation device 20 shown in FIG. 2, it is presently contemplated that each of the apertured tubes 21 will extend over more that one fourth of the length of the chamber 22 of the hose means 23. Similarly, in the embodiments of FIGS. 3 and 4, it is contemplated that each of the apertured tubes 21a, 21b will extend over more than one half of the length of its respective inlet or outlet chamber portion 39 or 40.

Although the previously illustrated embodiments provide for an inlet tube 21a and an outlet tube 21b that are both provided with holes 34, it has been found according to the teachings of this invention that only one of the tubes 21a, 21b need be provided with such holes. In addition, rather than providing a fairly wide space in the chamber 22 of the hose means 23 between the free ends 27, 28 of the inlet and outlet tubes 21a, 21b, a narrow gap could also be provided between such free ends. For example, reference is now made to FIG. 7, wherein another energy attenuation device of the present invention is shown and is indicated generally by the reference numeral 20C.

In the embodiment of the energy attenuation device 20C, the free ends 27, 28 of the inlet and outlet tubes 21a, 21b are separated from one another by only a narrow gap 42, for example a gap having a width of approximately 1/32-1/8 of an inch. In addition, only one of the tubes, namely the inlet tube 21a, is provided with holes 34, for example two such holes that are disposed 90° or 180° from one another. The narrow gap 42 between the free ends 27, 28 of the inlet and outlet tubes 21a, 21b has in this embodiment been illustrated as being displaced toward the outlet end of the chamber 22C. However, such narrow gap could also be disposed closer to the inlet end of the chamber 22C, in which case the outlet tube 21b would be longer than the inlet tube 21a. Furthermore, although the holes 34 have been illustrated as being disposed approximately half way between the inlet and outlet ends of the chamber 22c, such holes 34 could be disposed at any desired location along one of the inlet or outlet tubes 21a, 21 b. In addition, rather than being disposed on the inlet tube 21a, such holes 34 could also be disposed on the outlet tube 21b. Furthermore, any desired arrangement of the holes 34 is possible, and the embodiment of FIG. 2 could also be modified to include the narrow gap 42 of the embodiment of FIG. 7, wherein both the inlet tube 21a and the outlet tube 21b could again be provided with holes 34.

Figure 4:
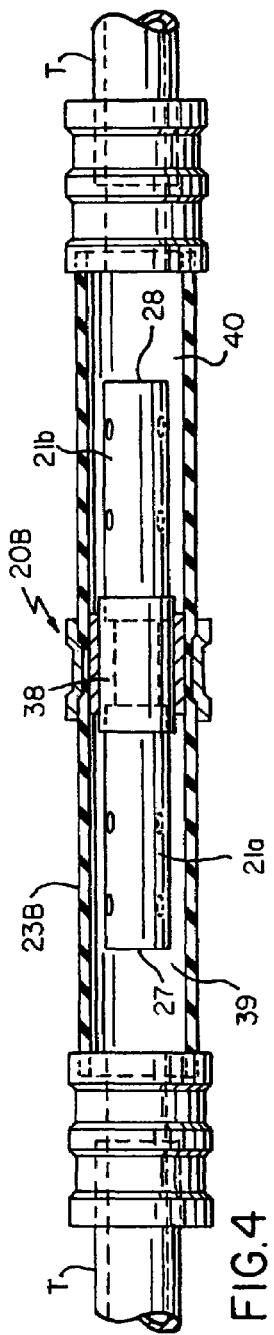
FIG. 4 is a cross-sectional view of a third exemplary embodiment of the energy attenuation apparatus of this invention.

In the embodiment of the energy attenuation device 20B illustrated in FIG. 4, a respective tube is disposed in each of the inlet and outlet chamber portions 39, 40. However, it has been found according to the teachings of this invention that only one of the chamber portions need contain a tube. For example, reference is now made to FIG. 8, wherein another energy attenuation device of the present invention is shown and is indicated generally by the reference numeral 20D.

In the embodiment of the energy attenuation device 20D, only one of the chambers contains a tube, with the other chamber being empty. In the illustrated embodiment, it is the inlet chamber portion 39 that contains no tube, and therefore forms the empty chamber 55, while the outlet chamber portion 40 contains a tube, namely the outlet tube 21b, which is illustrated as being connected to the restrictor 38 and having its free end 28 spaced from the outlet end of the chamber 40. The outlet tube 21b could also be connected to the outlet end of the chamber 40 and have its free end spaced from the restrictor 38. To provide fluid communication from the inlet chamber portion 39, i.e. the empty chamber 55, via the restrictor 38 to the outlet chamber 40, the outlet tube 21b is provided with at least one aperture. For example, the free end 28 of the outlet tube 21b could be open, while the peripheral surface of the tube 21b could be provided with no apertures. Alternatively, the peripheral surface of the tube 21b could be provided with at least one hole (see FIG. 8a), and the free end 28 of the tube could be open or closed off.

Rather than the inlet chamber portion 39 being empty, the empty chamber 55 could be formed by the outlet chamber portion 40, with the chamber 39 then being provided with the inlet tube 21a, which could be connected to the inlet end of the chamber 39 or to the restrictor 38. The empty chamber 55 could have a length of from ½ inch to 12 inches or even greater, and in one specific embodiment has a length of 140 mm, with the tube, for example the outlet tube 21b, having a length of 100 mm in a chamber portion that has a length of 140 mm.

In the embodiment of the energy attenuation device 20B of FIG. 4, the inlet and outlet tubes 21a, 21b are provided with holes on the peripheral surfaces thereof. However, it has been found according to the teachings of this invention that it would be possible to provide no holes on the peripheral surfaces of the inlet and outlet tubes and to have only the free ends of these tubes open. For example, reference is now made to FIG. 9, wherein another energy attenuation device of the present invention is shown and is indicated generally by the reference numeral 20E.

In the embodiment of the energy attenuation device 20E, the free ends 27, 28 of the inlet and outlet tubes 21a, 21b are open, while the peripheral surfaces of these tubes are not provided with any holes. In the illustrated embodiment, both the inlet and outlet tubes 21a, 21b are connected to the restrictor 38. However, it would also be possible to connect the inlet and outlet tubes to the inlet and outlet openings of their respective chambers, with the free ends of these tubes then being spaced from the restrictor 38, similar to the embodiment illustrated in FIG. 3. Again however only the free ends would be open while the peripheral surfaces of the inlet and outlet tubes 21a, 21b would have no holes.

The ratio of the length of the inlet tube 21a to the length of the outlet tube 21b could range from 1:5 to 5:1, and in one specific embodiment of the present invention both have the same length of 154 mm, with both the inlet and outlet chamber portions having a length of 194 mm.

In this embodiment, the inlet and outlet tubes 21a, 21b are made of polymeric material.

Although in the previous embodiments the energy attenuation devices have been illustrated as being provided with at most two chambers, it has been found according to the teachings of this invention that the hose or conduit means could be provided with three chambers. For example, reference is now made to FIGS. 10-19 and FIG. 23, wherein other energy attenuation apparatus of the present invention are shown and are indicated generally by the reference numerals 20F to 20P.

In the embodiment of the energy attenuation apparatus 20F, a further restrictor 57 is provided such that an intermediate chamber 58 that contains no physical structure, i.e. no tubes or any other energy attenuation device, in other words an empty chamber, is formed between the inlet and outlet chamber portions 39, 40. Although in the illustrated embodiment the inlet and outlet tubes 21a, 21b are connected directly to the restrictors 38, 57, with the free ends 27, 28 thereof being spaced from the inlet and outlet portions of the respective inlet and outlet chamber portions 39, 40, it would also be possible to connect the inlet and outlet tubes 21a, 21b directly to the inlet and outlet portions of their respective chambers, with the free ends of the tubes then being spaced from the respective restrictors 38, 57.

In addition, the free ends 27, 28 of the inlet and outlet tubes 21a, 21b could be open, while the peripheral surfaces of the tubes could be provided with no holes. Alternatively, the peripheral surface of at least one of the inlet and outlet tubes 21a, 21b could be provided with holes (see FIG. 10a) while the free ends of the tubes could be open or closed off.

Rather than the third, empty chamber 58 being provided between the inlet and outlet chamber portions 39, 40, the empty chamber 58 could also be disposed after the second chamber 59, as indicated in the embodiment of the energy attenuation apparatus 20G illustrated in FIG. 11, with the tubes 61 and 62 being disposed in the first or inlet chamber 39 and in the second chamber 59 respectively. Further exemplary embodiments of three chamber configurations will now be described.

Figure 12:
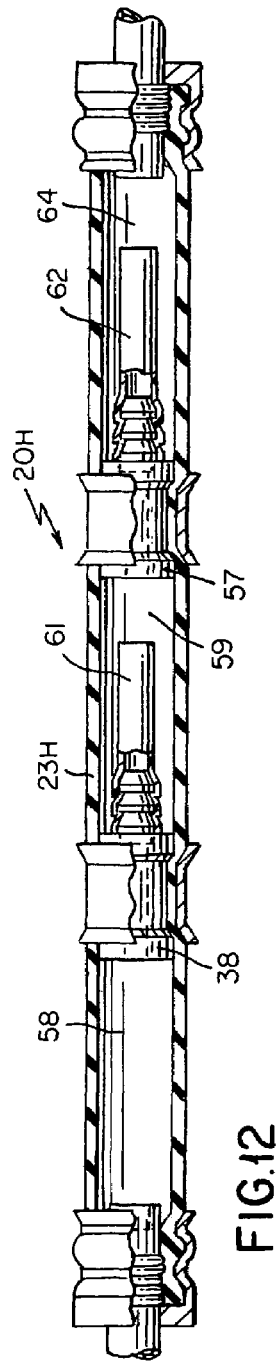
FIG. 12 is a cross-sectional view of a further exemplary embodiment of the energy attenuation apparatus of this invention.

In the embodiment of the energy attenuation apparatus 20H illustrated in FIG. 12, the empty chamber 58 is the first chamber, while the tube 61 is disposed in the second chamber 59 and the tube 62 is disposed in the third chamber 64.

Figure 13:
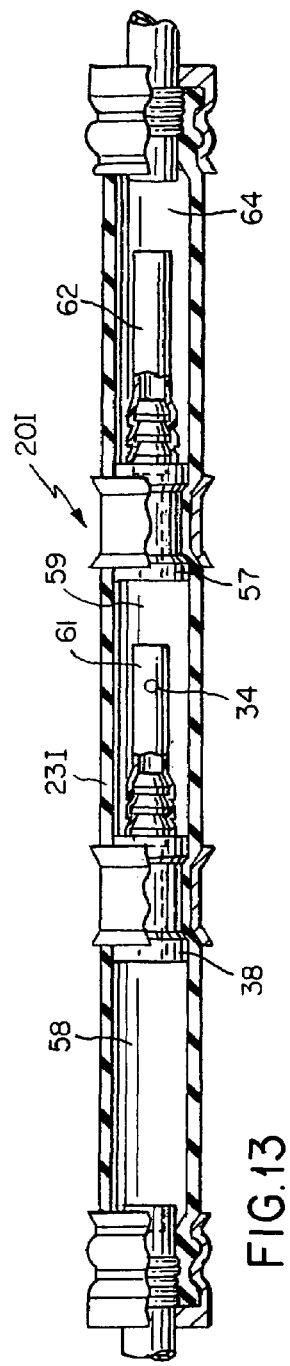
FIG. 13 is a view similar to that of FIG. 12 of a modified energy attenuation apparatus of this invention.
Figure 14:
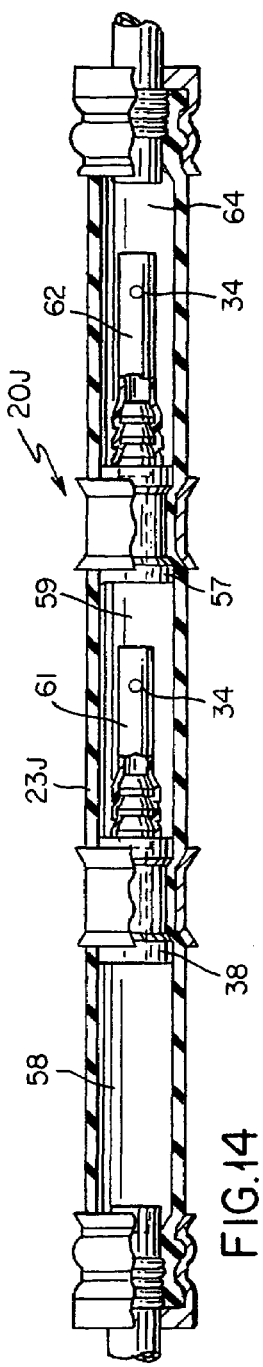
FIG. 14 is a view similar to that of FIG. 12 of a modified energy attenuation apparatus of this invention.

Whereas in the embodiment illustrated in FIG. 12 the ends of the tubes 61 and 62 are open, and the peripheral surfaces thereof are provided with no holes, the embodiment of the energy attenuation apparatus 20I illustrated in FIG. 13 shows that one of the tubes, here the tube 61 in the second chamber 59, can be provided with one or more holes 34. In the embodiment of the energy attenuation apparatus 20J illustrated in FIG. 14, both of the tubes 61 and 62 are provided with one or more holes 34. In both the embodiment of FIG. 13 and of FIG. 14, the ends of the tubes 61 and 62 can either be open or closed.

The embodiment of the energy attenuation apparatus 20K illustrated in FIG. 15 is similar to the embodiment illustrated in FIG. 10. In this embodiment, the tube 61 is disposed in the first chamber 39, while the tube 62 is disposed in the third chamber 64. The middle chamber 58 is an empty chamber. In this embodiment of FIG. 15, the tubes 61 and 62 are again shown as having no holes, with the free ends thereof being open. However, it is to be understood that again the peripheral surfaces of one or both of the tubes 61 and 62 could be provided with holes 34, while the free ends of the tubes 61 and 62 could be open or closed.

In the embodiment of the energy attenuation apparatus 20L illustrated in FIG. 16, the tubes 61 and 62 are disposed in the first chamber 39 and the second chamber 59 respectively, with the third chamber 58 being the empty chamber. Again, the peripheral surfaces of the tubes 61 and/or 62 could be provided with holes 34 if desired.

The embodiment of the energy attenuation apparatus 20M illustrated in FIG. 17 is similar to the energy attenuation apparatus 20H of FIG. 12. However, in the embodiment of the energy attenuation apparatus 20M, instead of being separated by restrictors, the chambers 58, 59 and 64 are separated by respective tubing T. Although in the embodiment of FIG. 17 the empty chamber 58 is shown as being the first chamber, the empty chamber could also be the second chamber 59 or the third chamber 64, similar to the showing of the embodiments of FIGS. 15 and 16. Furthermore, again the peripheral surfaces of the tubes 61 and 62 could be provided with holes 34, and the free ends of these tubes could be opened or closed.

Figure 18:
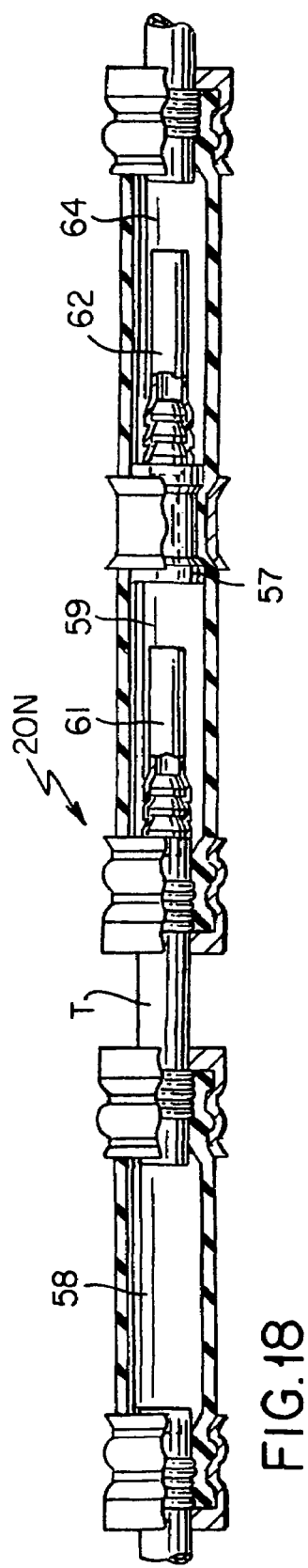
FIG. 18 is a view similar to that of FIG. 12 of a modified energy attenuation apparatus of this invention.
Figure 19:
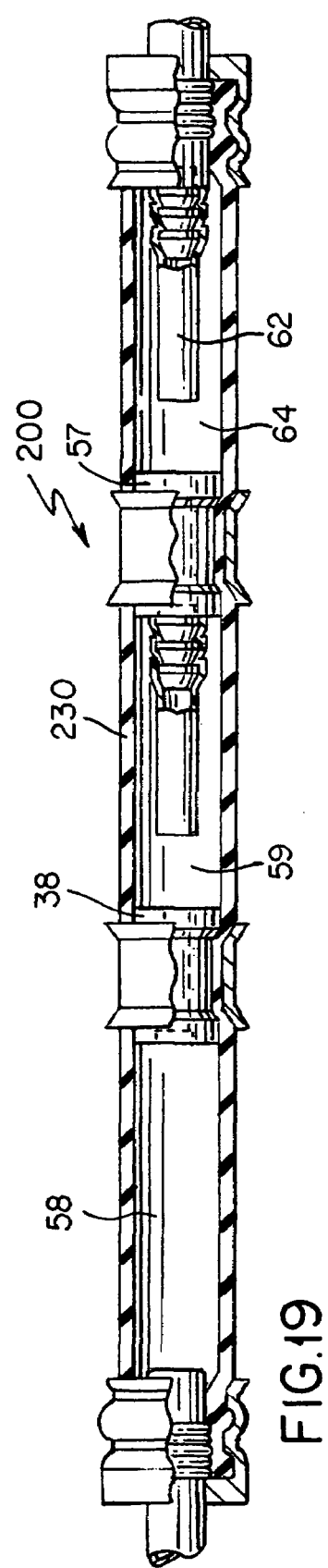
FIG. 19 is a view similar to that of FIG. 12 of a modified energy attenuation apparatus of this invention.
Figure 23:
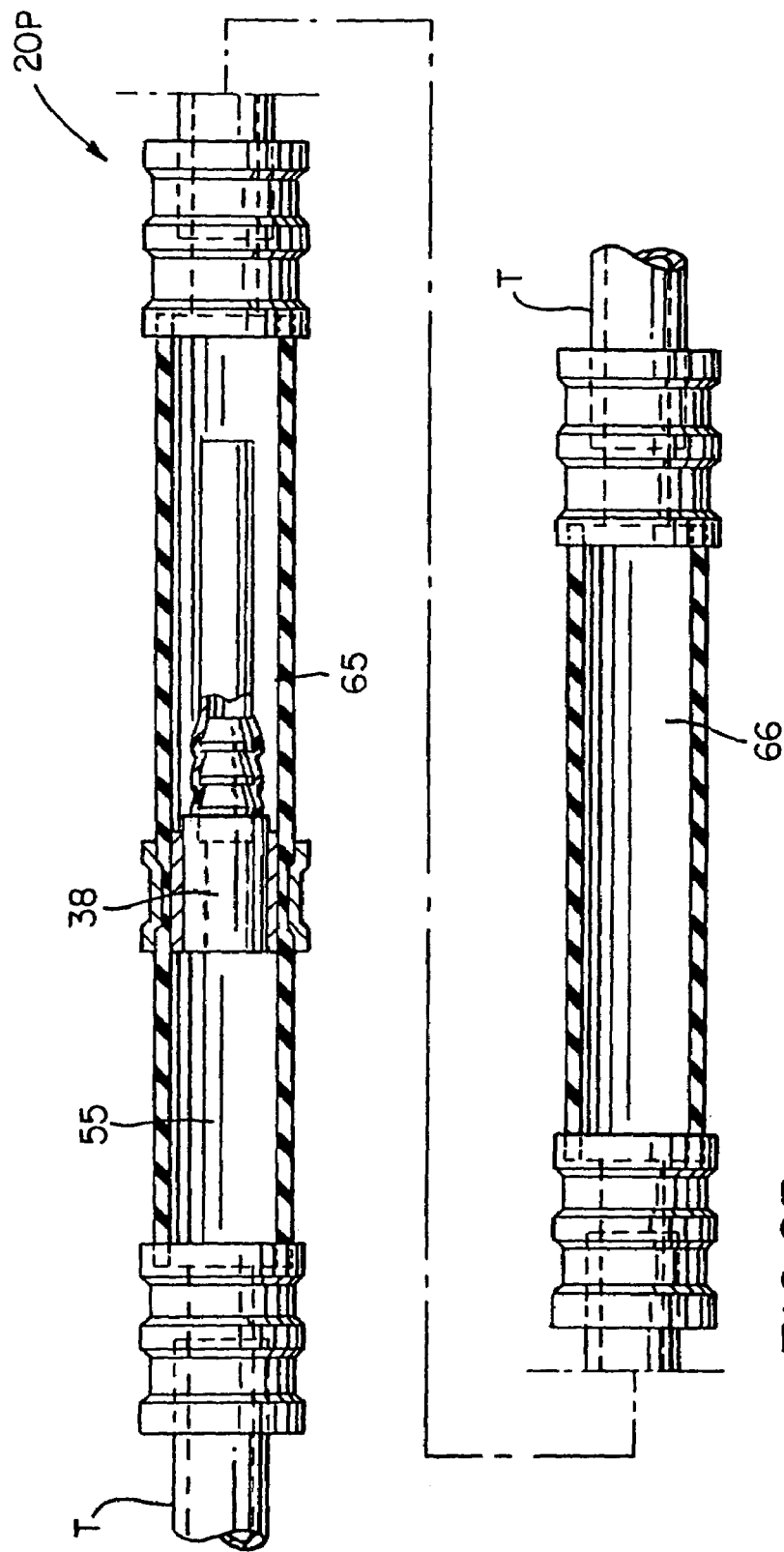
FIG. 23 is a cross-sectional view of a further exemplary embodiment of an energy attenuation apparatus of this invention.

In the embodiment of the energy attenuation apparatus 20N illustrated in FIG. 18, an arrangement similar to that of the embodiment of FIG. 12 is illustrated. However, in the embodiment of FIG. 18, the first chamber 58 and the second chamber 59 are separated by a tubing T rather than a restrictor, while the second chamber 59 and the third chamber 64 continue to be separated by the restrictor 57. It is to be understood that rather than the first and second chambers being separated by tubing T, these two chambers could be separated by a restrictor while the second chamber 59 and the third chamber 64 are separated by tubing T.

In the embodiments of the energy attenuation apparatus illustrated in FIGS. 11-18, the end of the tubes shown as being connected, either to the liquid-conveying means or to the restrictor or tubing, has always been the left hand end. However, it is to be understood that at least for some of the tubes the situation could be reversed, in other words, with the right hand ends being connected. By way of example, in the embodiment illustrated in FIG. 19, the tube 61, rather than being connected to the restrictor 38, is connected at the right hand end, in a fluid communicating manner, to the restrictor 57, with the left hand or free end of the tube 61 being opened and spaced from the restrictor 38. Similarly, the tube 61 is connected at the outlet end of the chamber 64, with the open free end of the tube 62 being spaced from the restrictor 57. Although in the embodiment of FIG. 19 the empty chamber 58 has been shown as being the first chamber, this empty chamber could also be either the second chamber or the third chamber. In addition, the peripheral surfaces of the tubes 61 and 62 could, if desired, be provided with holes 34, and the free ends of these tubes could be opened or closed.

The ratio of the length of the inlet tube 21a to the length of the outlet tube 21b could range from 1:5 to 5:1 or even greater. The empty, for example intermediate, chamber 58 has an effective length of from ½ inch to 24 inches or even greater. In one specific embodiment of the present invention, the intermediate chamber 58 has a length of 200 mm, and the inlet and outlet tubes 21a, 21b both have the same length of 115 mm, with both the inlet and outlet chamber portions having a length of 155 mm.

The restrictors 38, 57 can, for example, have a length of from 41 to 46 mm.

The hose or liquid-conveying means 23 can be a single section of rubber and/or other elastomeric or plastic material that is connected to metal, especially stainless steel, tubing T by means of the couplings 36, or the hose means can also comprise separate hose sections that are interconnected by restrictor means or tubing. Furthermore, the hose means 23 may be made of a single layer or of a plurality of layers of the aforementioned rubber and/or plastic. The hose means 23 may also be suitably reinforced to withstand comparatively high fluid pressures. The hose means 23 could furthermore be made of metal, such as stainless steel. In addition, although the tubes 21, 61, 62 have been illustrated as being disposed in the hose means 23, such hose or conduit means can actually be a continuation of the tubing T, or a separate tubing section, again made of metal. In contrast, the tubes can be made of polymeric material, especially tetrafluoroethylene fluorocarbon resins, fluorinated ethylene-propylene resins, or polyamide; the apertured and/or open tubes could also be made of metal, especially stainless steel, or rubber. Thus, the tubes can be either flexible or rigid. For the sake of convenience, the cross-sectional views of FIGS. 10b to 10g through the hose means and the tubes to show the various material possibilities therefore have been taken in conjunction with the embodiment of FIG. 10. It is, however, to be understood that these views apply to the other illustrated and described embodiments as well. Where the conduit means is a hose of rubber, other elastomeric material, or metal, it can, for example, have an inner diameter of ⅜ inch to ½ inch or larger. The diameter of the inlet and outlet tubes 21a, 21b, and of the tubes 61, 62, 71 and 72, will depend largely upon the diameter of the conduit means 23. For example, if the conduit means has an inner diameter of ⅜ inches, the inlet and outlet tubes could have an outer diameter of 5/16 inches or less. Similarly, if the conduit means has an inner diameter of ½ inches, the inlet and outlet tubes could have an outer diameter of ⅜ inches or less. The annular space between the outer peripheral surface of a tube and the inner peripheral surface of the liquid-conveying means can range from 1/32 to ⅜ of an inch. The length of the conduit means, and hence of the inlet and outlet tubes, can vary depending upon need and available space and can range from 2 inches to 12 feet.

As indicated previously, the open ends of the tubes of the embodiments illustrated in FIGS. 10-19 and 23-27 are spaced from the ends of their respective chamber. Such spacing is presently contemplated as ranging from 5 mm to 500 mm, and in presently preferred embodiments ranges from 30-40 mm.

The size and shape of the holes 34 can also vary. For example, circular holes 34 can have a diameter of 1/16 inches, ⅛ inches, etc. If the holes 34 have an oval shape, pursuant to one specific embodiment of the present invention the dimension of such holes can be ⅛ inches in width by ½ inches in length.

The restrictor means 38, 57 has an inner diameter that is less than the inner diameter of the hose means 23. In addition, the inner diameter of the restrictor 38, 57 can be equal to, greater than or less than the inner diameter of the inlet and outlet tubes. The restrictor means can be made of any suitable material, including metal, rubber and polymeric material (see FIGS. 5a and 5b).

Where tubing T is provided between chambers, such tubing can have a length of from 1 to 50 inches.

Figure 20:
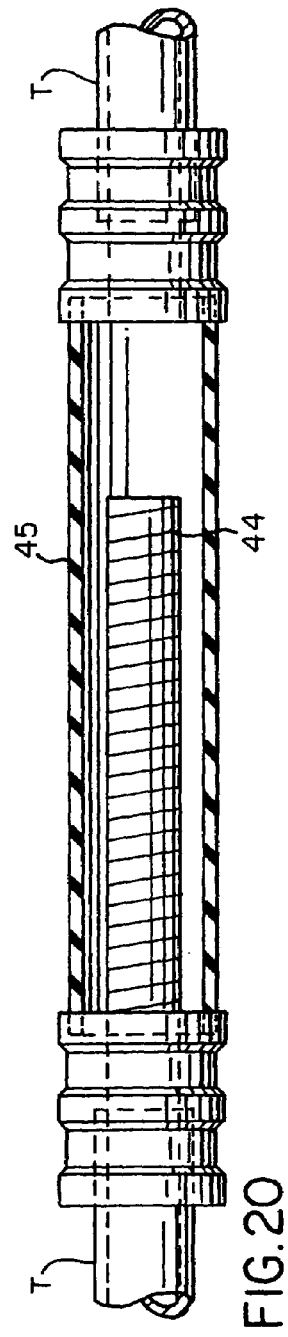
FIGS. 20 and 21 show various embodiments of tuning cable or tube arrangements for use in conjunction with the energy attenuation apparatus of this invention.
Figure 21:
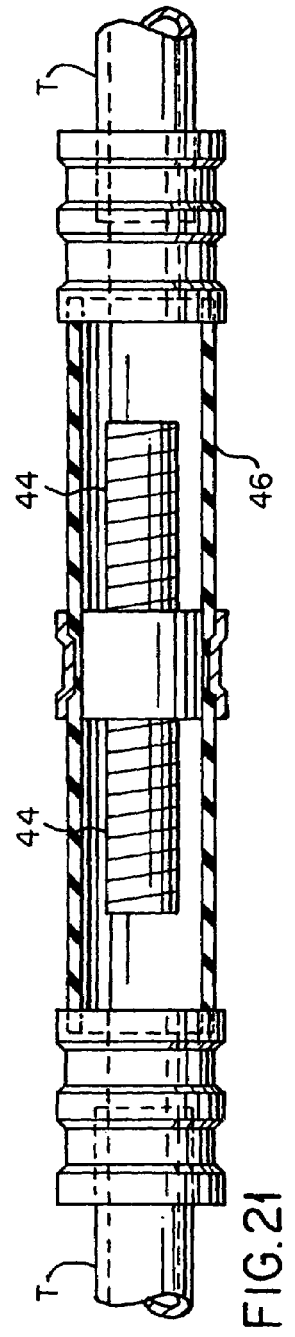

The inventive energy attenuation device can also be used in conjunction with a variety of other sound and vibration attenuation devices, which are then also disposed in the pressure line 12 and/or return line 14. For example, a ¼ wave cable tuning assembly can be provided, for example by disposing a steel cable in a further hose section. Examples of such tuning cable arrangements in further hose sections are shown in FIGS. 20 and 21, wherein FIG. 20 shows a single tuning cable 44 disposed in the further hose section or conduit means 45, whereas FIG. 21 shows two separate tuning cables 44 disposed in a further hose section or conduit means 46. An example of a known tuning cable is disclosed in the aforementioned patent to Klees, U.S. Pat. No. 5,323,305, which patent has been incorporated into this disclosure. The tuning cable arrangements in the conduit means 45 or 46 can be disposed in series with the inventive energy attenuation device, or can be disposed in parallel therewith. Other sound and vibration attenuation devices are also known. For example, reference is made to U.S. Pat. No. 4,611,633 (Buchholz et al), U.S. Pat. No. 5,172,729 (Vantelini) and U.S. Pat. No. 5,201,343 (Zimmermann et al) whereby such US patents are also being incorporated into this disclosure by this reference thereto. Furthermore, a spring-type energy attenuation device as disclosed in applicants' co-pending U.S. patent application Ser. No. 08/853,770 could also be provided, whereby the disclosure of such application is also incorporated into this disclosure by this reference thereto. One or more of such other attenuation devices could also be used in conjunction with the energy attenuation apparatus 20-20T of the present invention. For example, FIG. 22 shows an arrangement where the tubing T is split into branches 48, each of which leads to an energy attenuation device that is schematically indicated by one of the boxes 50 or 51. This parallel arrangement can either be disposed in series with one of the inventive energy attenuation apparatus 20-20T, or one of the boxes 50, 51 can contain an inventive energy attenuation apparatus while the other box contains a known attenuation apparatus. Furthermore, both boxes 50 and 51 can contain the same or different ones of the inventive energy attenuation apparatus 20-20T. It should be noted that two or more of the inventive energy attenuation apparatus could be disposed in series and/or in parallel with one another, or even with an empty hose section. For example, reference is now made to FIG. 23, which illustrates another energy attenuation apparatus 20P of the present invention. This embodiment shows an empty hose section 66 in series with one of the other inventive embodiments previously described, such as, by way of example, the embodiment 20D of FIG. 8. The empty hose section 66 could also be disposed upstream of the other inventive embodiment, or even in parallel therewith. Furthermore, the embodiment of the energy attenuation apparatus 20P of FIG. 23 could also be similar to the embodiment of FIG. 12, wherein all three chambers are disposed in series in a liquid-conveying means. The middle chamber would then be separated from the third or empty chamber 66 by a further restrictor similar to the restrictor 57. In addition, whereas in this embodiment the chambers are separated from one another by restrictors, two or all three of the chambers could be separated from one another by respective tubing, or two of the chambers could be separated by tubing and the other two by a restrictor.

Although in the previous embodiments the energy attenuation devices have been illustrated as being provided with at most three chambers, it has been found according to the teachings of this invention that the hose, conduit means or liquid-conveying means could be provided with four chambers. For example, reference is now made to FIGS. 24-27, wherein other energy attenuation apparatus of the present invention are shown and are indicated generally by the reference numerals 20Q to 20T.

In the embodiment of the energy attenuation apparatus 20Q, two liquid-conveying means 68 and 68' are provided, each of which contains two chambers 64Q that are separated from, and communicate with, one another via respective restrictors 38Q. The two separate liquid-conveying means 68, 68' are separated from, and communicate with, one another via a tubing section 69, with the two liquid-conveying means 68, 68' being connected to the tubing section 69 by respective couplings 70. Each of the chambers 64Q contains a respective tube 61Q, 62Q, 71 or 72 such that again an annular space 33Q is formed between the inner peripheral surface of the liquid-conveying means 68 or 68' and the outer peripheral surface of the tubes contained in the chambers thereof. Although in the illustrated embodiment the tubes 61Q, 62Q, 71 and 72 are connected at an upstream end in their chambers 64Q, with the free ends of the tubes being spaced from an outlet or downstream end of their chambers, it would also be possible to connect one or more of the tubes at a downstream end, with the free ends of those tubes then being spaced from an upstream end of their chamber.

Whereas in the embodiment illustrated in FIG. 24 the ends of the tubes 61Q, 62Q, 71 and 72 are open, and the peripheral surfaces thereof are provided with no holes, the embodiment of the energy attenuation apparatus 20R illustrated in FIG. 25 shows that one of the tubes, here the tube 61R in the first chamber 64R, can be provided with one or more holes 34R. It is to be understood that the hole or holes 34R could not only be in any one of the tubes 61R, 62R, 71R or 72R, they could also be provided in more than one of the tubes, with the ends of the tubes that contain the holes being either open or closed. In the embodiment of the energy attenuation apparatus 20S shown in FIG. 26, one of the chambers, here the first chamber 64S, contains no physical structure, i.e., no tubes or any other energy attenuation device, in other words is an empty chamber. Although in the illustrated embodiment the first chamber 64S is shown as the empty chamber, any one of the four chambers could be the empty chamber, with each of the remaining chambers containing a respective tube.

Figure 26:
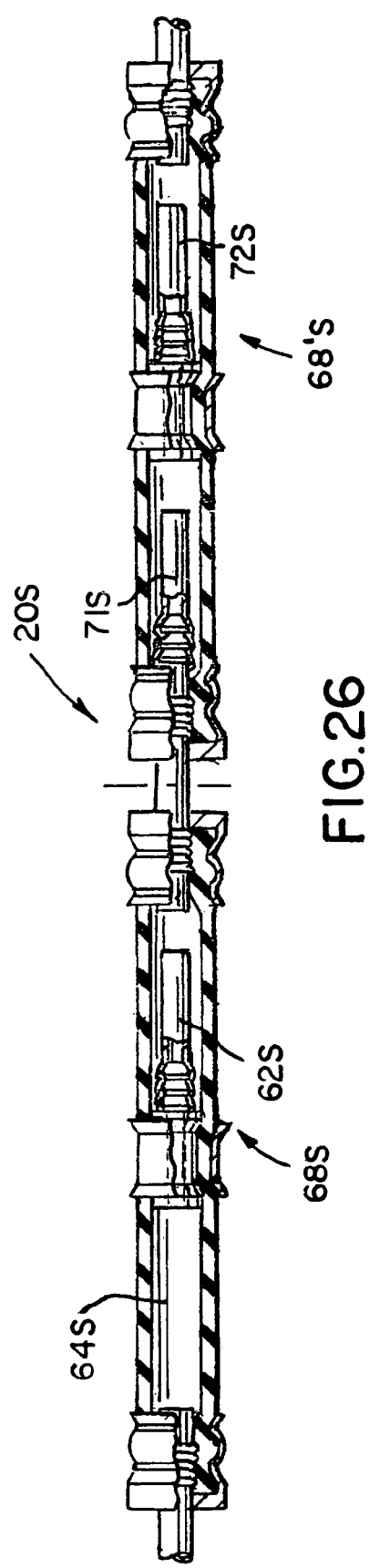
FIG. 26 is a view similar to that of FIG. 24 of a modified energy attenuation apparatus of this invention.
Figure 27:
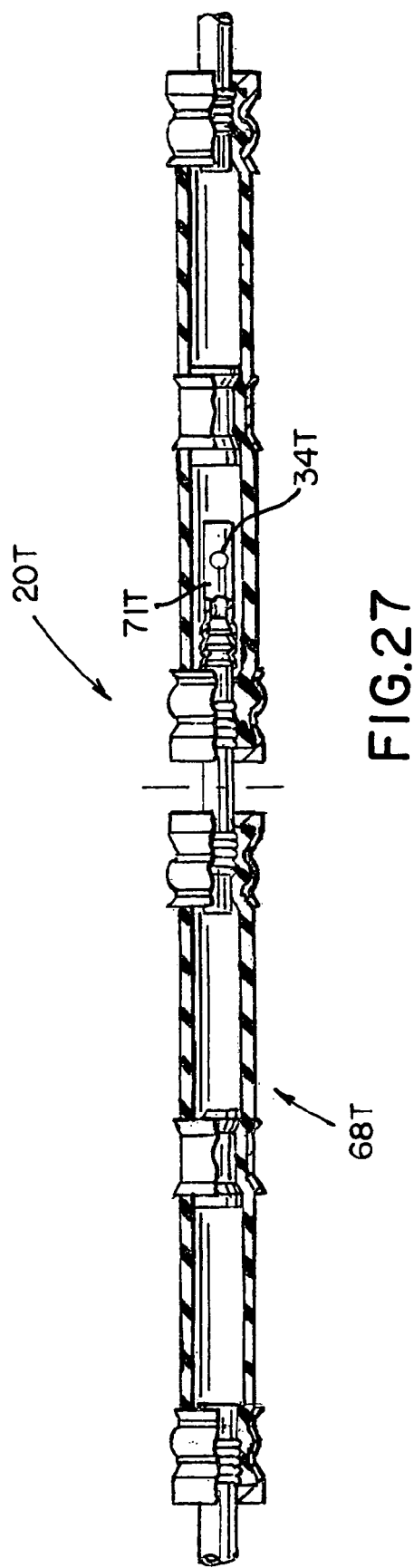
FIG. 27 is a view similar to that of FIG. 24 of a modified energy attenuation apparatus of this invention.

Although in the embodiment illustrated in FIG. 26 only one of the chambers is empty, one, two or three of the chambers could be empty, in any desired order, with the remaining chambers containing a tube. For example, reference is now made to the embodiment of the energy attenuation apparatus 20T illustrated in FIG. 27, where three of the chambers 64T are empty, with the other chamber, in this case the third chamber, containing a tube 71T. Again, the chamber 64T containing a tube could be any one of the four chambers. In addition, the tubes can again have no aperture on their peripheral surface, with the free ends then being open, as illustrated in FIG. 26. However, one or more of the tubes could also be provided with at least one aperture or hole 34 on the peripheral surface of the tube, with the free end being open or closed.

Although in the embodiments of the energy attenuation apparatus 20Q-20T illustrated in FIGS. 24-27 two liquid-conveying means 68 and 68' are interconnected by the tubing section 69 are shown, various other arrangements of four chambers in series could be provided. For example, all of the chambers, whether containing a tube or empty, could be disposed in a single liquid-conveying means or hose section 23, similar to the situation in the three-chamber embodiments illustrated in FIG. 11 and others. In such a case, the various chambers would be separated from one another by respective restrictors 38. Furthermore, all of the chambers 64 could be provided in separate liquid-conveying means that are separated from, and in communication with, one another, for example by respective tubing sections, similar to the three-chamber embodiment illustrated in FIG. 17. Various combinations of the foregoing could, of course, also be provided.

In view of the foregoing, it can be seen that this invention not only provides a new energy attenuation device, but also this invention provides a new method for attenuating energy in a fluid conveying system.

While the forms and methods of this invention is now preferred have been illustrated and described as required by the Patent Statute, it is to be understood that other forms and method steps can be utilized and still fall within the scope of the appended claims, whereby it is believed that each claim sets forth a novel, useful and unobvious invention within the purview of the Patent Statute.

What is claimed is:

1. An energy attenuation apparatus in fluid communication with tubing that is adapted to convey a liquid under pressure, said apparatus comprising:
a liquid-conveying means that is in fluid communication with said tubing and has a diameter that is greater than a diameter of said tubing, wherein said liquid-conveying means is provided with four chambers disposed in series, wherein at least one of said chambers contains a tube, wherein an annular space is formed between an inner peripheral surface of said liquid-conveying means and an outer peripheral surface of said tube, wherein said tube has a first end connected to and in fluid communication with an inlet or outlet end of said at least one chamber, wherein said tube has a second, free end that is spaced by an open gap from said outlet or inlet end of said at least one chamber, wherein said tube has at least one aperture in said free end and/or on said peripheral surface thereof for providing fluid communication between said tube and said at least one chamber, and wherein at least one of said chambers contains no physical structure.

2. An energy attenuation apparatus according to claim 1, wherein one, two or three of said chambers contains no physical structure.

3. An energy attenuation apparatus in fluid communication with tubing that is adapted to convey a liquid under pressure, said apparatus comprising:
a liquid-conveying means that is in fluid communication with said tubing and has a diameter that is greater than a diameter of said tubing, wherein said liquid-conveying means is provided with four chambers disposed in series, wherein at least one of said chambers contains a tube, wherein an annular space is formed between an inner peripheral surface of said liquid conveying means and an outer peripheral surface of said tube, wherein said tube has a first end connected to and in fluid communication with an inlet or outlet end of said at least one chamber, wherein said tube has a second, free end that is spaced by an open gap from said outlet or inlet end of said at least one chamber, wherein said tube has at least one aperture in said free end and/or on said peripheral surface thereof for providing fluid communication between said tube and said at least one chamber, and wherein at least one of said chambers contains no physical structure.

* * * * *